United States Patent Office 2,973,344
Patented Feb. 28, 1961

2,973,344
MODIFIED POLYMERS
Egi V. Fasce, Baton Rouge, La., assignor to Esso Research and Engineering Company, a corporation of Delaware
No Drawing. Filed Dec. 11, 1957, Ser. No. 701,982
9 Claims. (Cl. 260—78.4)

This invention relates to modified low pressure polyalkene polymers and copolymers. More particularly, it relates to low pressure polymers and copolymers modified with unsaturated alpha-beta dicarboxylic acid anhydrides and to the process for preparing them.

The low pressure polyalkene polymers and copolymers useful for forming the modified polymers of the invention are well-known to the art, see e.g. Belgium Patent 533,362; "Chemical and Engineering News," April 8, 1957, pages 12 to 16; and "Petroleum Refiner," December 1956, pages 191 through 196. These polymers are prepared by the polymerization of alpha olefins with catalyst systems made up of reducible heavy transition metal compounds such as titanium tetrachloride and a reducing metal compound such as the alkyl aluminum compounds. Particular polymers that can be utilized include polyethylene, polypropylene, polybutene, polyheptene and the like with polyethylene and polypropylene being preferred. Examples of low pressure copolymers useful herein are ethylene-propylene and ethylene-butene copolymers.

For purposes of convenience, the preparation of polyolefins by the low pressure process is given below, although it should be understood that this process does not constitute a part of the invention.

The alpha olefins utilized in the low pressure polymerization process include ethylene, propylene, butene-1, heptene-1, dodecene-1 and the like with ethylene and propylene preferred. The catalysts used in the polymerization reaction are solid insoluble reaction products obtained by reducing a reducible heavy transition metal compound, the metal component of which is taken from groups IVB, VIB or VIII of the periodic table according to Lange Handbook of Chemistry, 7th ed., Handbook Publishers (1949), pages 58–59, or manganese with a reducing organometallic compound of an alkali, alkaline earth, rare earth or zinc metal compound. The catalyst can also be prepared by reducing an appropriate metal compound with either metallic aluminum, or a mixture of aluminum and titanium, or the like. The preferred catalyst of this type is usually prepared by reducing one mole of a titanium tetrahalide, preferably tetrachloride, to the corresponding trivalent titanium halide with about 0.2 to 6 moles of either aluminum triethyl or aluminum triisobutyl or other aluminum alkyl compound of the formula RR′AlX wherein, R, R′ and X preferably are alkyl groups having from 2 to 8 carbon atoms, although X can be hydrogen or halogen, preferably chlorine. The reduction is best carried out by dissolving each of the two catalyst components in an inert solvent, preferably a $C_3$ to $C_{18}$ paraffin hydrocarbon such as isopentane or n-heptane, and mixing the two solutions in the proper proportions at a temperature between 0° and 150° C. and in the absence of moisture, oxygen and sulfur impurities. The resulting precipitate in conjunction with some free aluminum alkyl compound is generally considered to constitute the actual active polymerization catalyst. Accordingly, the catalyst preparation is preferably carried out by using only about 0.3 to 0.8 mole of the aluminum alkyl compound per mole of titanium chloride, followed by the addition of the supplemental amount of the aluminum alkyl compound to the polymerization zone to raise the Al/Ti mole ratio to a value between about 1:1 and 3:1.

The alpha olefins are then contacted with the resulting catalyst in the presence of the same or different inert hydrocarbon solvent such as isopentane, n-heptane, xylene, and the like. The polymerization is conveniently carried out at temperatures of about 0 to 100° C. and pressures in the range of about 0 to 500 p.s.i.g., preferably 0 to 50 p.s.i.g. The catalyst concentration in the polymerization zone is preferably in the range of about 0.1 to 0.5%, based on the weight of total liquid present. The polymer product concentration in the polymerization zone is preferably maintained between about 2 to 25%, based on the weight of total contents, to allow easy handling of the polymerized mixture. The proper polymer concentration can be obtained either by having a sufficient quantity of the inert diluent present or by stopping the polymerization reaction before 100% conversion has occurred. When the desired degree of polymerization has been obtained, a $C_1$ to $C_8$ alkanol such as isopropyl alcohol or n-butyl alcohol, desirably in combination with a chelating agent such as acetyl acetone, is normally added to the reaction mixture to dissolve and deactivate the catalyst and to precipitate the polymer product from solution. After filtration, the solid polymer can be further washed with alcohol or an acid such as hydrochloric acid, dried, compacted and packaged.

When the term "low pressure polymerization process" is used herein, it is to be understood to refer to the above process. The terms "low pressure polymers" and "low pressure copolymers" are to be understoood to mean polymers and copolymers produced in accordance with the low pressure polymerization process. Henceforth, when the term polymer is used herein it is to be understood to apply to copolymers as well as to polymers.

It is known that the low pressure polymers possess sufficient nonterminal unsaturation to react with compounds such as chlorine and sulfuryl chloride to produce modified polymers having low melting points and increased solubility in nonpolar solvents.

It has now been found surprisingly that polymers and copolymers formed by the low pressure process can be reacted with unsaturated alpha-beta dicarboxylic acid anhydrides to produce modified polymers having high melting points and very low solubility in nonpolar solvents.

The unsaturated alpha-beta dicarboxylic acid anhydrides useful for forming the modified polymers of the invention are exemplified by maleic anhydride, citraconic anhydride, dimethyl maleic anhydride, and the like, with maleic anhydride being particularly preferred. A mixture of anhydrides can be used although it is generally preferred to employ a single anhydride.

The reaction between the low pressure polymer and the unsaturated alpha-beta dicarboxylic acid anhydride can be carried out by heating a mixture of the polymer and anhydride in an inert solvent, preferably with refluxing of the solvent. The inert solvents that can be used include aromatic, acyclic, and cyclic hydrocarbons; e.g. tetralin, acid treated kerosene products, acid treated naphthene-paraffin oils. Alternatively, the reaction can be carried out without a solvent by mixing the components together and heating them to temperatures in the range of 250° to 400° F. preferably 275° to 350° F. The reaction temperatures for the mixtures including a solvent are in the range of 300° to 500° F., preferably 300° to 400° F. In general, the solvent is chosen so as to maintain refluxing conditions at reaction temperatures. The reaction is carried out for a length of time sufficient to produce the modified polymer. In general, the time will range between 0.5 and 3 hours, preferably 1 to 2 hours. The reaction is preferably run at atmospheric pressure although pressures up to 500 p.s.i.g. can be used. Where pressures above atmospheric pressure are employed for the reaction, the pressure and the solvent will generally be chosen so as to maintain refluxing at the desired reaction temperature. The reaction between the polymer and the unsaturated alpha-beta dicarboxylic acid anhydride can also be carried out by heating the anhydride with a freshly prepared polymer-containing reaction mixture obtained from the low pressure polymerization of the corresponding monomer.

In general from about 20 to 99 wt. percent, preferably 50 to 99 wt. percent of polymer and from about 80 to 1 wt. percent, preferably 50 to 1 wt. percent of unsaturated alpha-beta dicarboxylic acid anhydride are reacted together to form the modified polymers of the invention. When the reaction is carried out in an inert solvent, about 10 to 300 wt. percent, preferably 100 to 200 wt. percent of solvent is used based on the total weight of the polymer and the anhydride employed.

The reaction between the polymer and the anhydride generally takes place without requiring the use of a catalyst. However, free radical-type catalysts such as the peroxide and hydroperoxide catalysts, e.g. tertiary butyl peroxide can be employed in concentrations of 0.1 to 1 wt. percent, based on the weight of polymer.

The invention will be better understood by reference to the following examples.

EXAMPLE I

A modified polyethylene polymer was prepared by first placing in 200 cc. of a heavily acid treated kerosene cut in a 500 cc. 3-neck flask equipped with a stirrer and a reflux condenser, 20 grams of polyethylene having an average molecular weight of 59,000 determined by the Harris intrinsic viscosity method and prepared by the low pressure polymerization of ethylene using a 1:1 mol ratio diethyl aluminum chloride-titanium tetrachloride catalyst. Then 50 grams of maleic anhydride was added to the flask and the resulting mixture heated for one hour with agitation at 360° F. At this temperature the mixture was essentially fluid. The mixture was then allowed to cool with stirring, and when cool treated with 200 cc. of 20% sodium hydroxide solution. The treated mixture was then heated at 200° F. for 30 minutes with agitation and filtered. The precipitate was thoroughly washed with 150° F. hot water to remove any sodium hydroxide left on the precipitate. 22 grams of a stringy solid modified polyethylene product was obtained which was completely insoluble in hot tetralin, and had a melting point of 191° C. The properties of the modified polyethylene product are listed in Table I. Also, the properties of the unmodified polyethylene used to produce the modified polyethylene product are listed in Table I in an adjacent column for comparison purposes.

EXAMPLE II

A modified polypropylene polymer was prepared by first placing in a 1000 cc. flask equipped with a stirrer and reflux condenser 4 grams of polypropylene having a molecular weight of 98,000 and formed by polymerizing propylene in 500 cc. of tetralin in contact with a 2:1 mol ratio $Al(C_2O_5)_3$—$TiCl_4$ catalyst at a concentration of 1.84 g./l. This catalyst was prepared by forming a 0.5:1 mol ratio aluminum triethyl:$TiCl_4$ mixture, treating this mixture for one hour at 157° F. and then diluting the catalyst to a 2:1—Al:Ti ratio with additional aluminum triethyl. 4 grams of maleic anhydride was then added and the resulting mixture agitated and refluxed for one hour at a temperature in the range of 380 to 390° F. The color changed to pale yellow after initial agitation at room temperature and then to a deep orange yellow when heated at 380° to 390° F. The mixture was allowed to cool, and upon cooling precipitated out a stringy solid. The reaction mixture including the precipitate was extracted three times, each time with 200 cc. of 150° F. hot water. The water layers were removed and discarded. The reaction mixture was then filtered and the tetralin filtrate diluted with 3 times its volume of isopropyl alcohol to precipitate dissolved polymer. The tetralin filtrate was then filtered and the precipitates added together to yield 2.28 grams of a white product. The product was first washed with isopropyl alcohol and then with acetone and dried. 1.7 grams of a white stringy modified polypropylene product which was insoluble in tetralin was obtained. The properties of the modified polypropylene product and the unmodified polypropylene used to produce the modified product are listed in Table I.

The following example illustrates the modification of the process which involves adding the anhydride to a polypropylene containing reaction mixture freshly produced from propylene by the low pressure process.

EXAMPLE III

Propylene feed was contacted in oxygen-free n-heptane diluent in a batch precision unit with 1.8 grams of a 2:1 mole ratio triethyl aluminum-titanium trichloride catalyst for one hour at 150° F., with a propylene feed rate of 100 liters per hour. The catalyst was prepared by treating a 0.33:1 mol ratio aluminum triethyl-titanium tetrachloride mixture at 284° F. for one hour to form violet $TiCl_3$ and then diluting the $TiCl_3$ with additional aluminum triethyl to an Al:Ti mol ratio of 2:1. Thereafter, 16 grams of finely powdered maleic anhydride was added to the reaction mixture and the mixture agitated for 30 minutes at 150° F. Then 500 cc. of isopropyl alcohol containing 5 wt. percent acetyl acetone was added to the reaction mixture. The mixture was agitated for 30 minutes at 150° F., allowed to cool, filtered, washed with isopropyl alcohol and then with acetone and air dried.

Unmodified polypropylene was also prepared using the above process except that maleic anhydride was not added to the reaction mixture. The properties of the modified and unmodified polypropylene are given in Table I.

*Table I*

|  | Example I | | Example II | | Example III | |
|---|---|---|---|---|---|---|
|  | Unmodified Polyethylene | Modified Polyethylene | Unmodified Polypropylene | Modified Polypropylene | Unmodified Polypropylene | Modified Polypropylene |
| Properties: | | | | | | |
| Melting point, °C | 128 | 191 | | | | |
| Softening point, °C | 125 | 129 | | | | |
| Intrinsic viscosity | 0.135 | | 0.616 | 3.24 | 2.21 | 2.35 |
| Tetralin solubility, wt. percent | 1 | 0 | | | | |
| Ethyl acetate solubility, wt. percent | | 0.021 | | | | |
| Molecular wt. × 10⁻³, Harris | 59 | (1) | 98 | 237 | 129 | 142 |
| Tensile strength, p.s.i | | | | | 2,325 | 2,450 |

[1] Insoluble in tetralin.

As can be seen from the above table, the modified polymers of the invention have higher melting points, softening points, are much less soluble in nonpolar solvents such as tetralin and have a very low solubility in semipolar solvents such as ethyl acetate, and have higher molecular weights than the corresponding unmodified polymers. Additionally, the tensile strength of the modified polymer of Example III is slightly greater than that of the corresponding unmodified polymer.

Accordingly, it can be seen from the above advantageous characteristics of the modified polymers of the invention that these polymers can be employed to form equipment such as pipes and bottles which can be used in contact with nonpolar solvents. Also, modified polymers of the invention can be used to form objects requiring good tensile strength and hardness characteristics such as molded articles. Other uses of the modified polymer of the invention will readily be recognized by those in the plastics industry.

It is to be understood that this invention is not limited to the specific examples which have been given merely as illustrations and that modifications can be employed without departing from the scope and spirit of the invention.

What is claimed is:

1. The process for preparing solid modified polyalkene polymers consisting of reacting together at a temperature in the range of 250° to 500° F. and at a pressure of 0 to 500 p.s.i.g. (a) 20 to 99 wt. % of a solid low-pressure alpha olefin polyalkene polymer selected from the group consisting of polyethylene, polypropylene, polybutene, polyheptene, ethylene-propylene copolymer and ethylene-butene copolymer and formed by a low-pressure process at a temperature in the range of 0 to 100° C. and at a pressure in the range of 0 to 500 p.s.i.g. using as catalyst the reaction product obtained by reducing a reducible heavy transition metal compound of groups IVB, VIB and VIII with a reducing organo-metallic compound, the metal component of which is selected from the group consisting of alkali metals, alkaline earth metals, rare earth metals and zinc, and (b) from 80 to 1 wt. % of an unsaturated alpha-beta dicarboxylic acid cyclic anhydride, said unsaturation being olefinic unsaturation; and isolating a solid modified polyalkene polymer from the resulting reaction mixture.

2. The modified polymer of claim 1 wherein the unsaturated alpha-beta dicarboxylic acid anhydride is maleic anhydride.

3. A solid modified polyalkene polymer prepared by the process consisting of reacting together at a temperature in the range of 250° to 500° F. and at a pressure of from 0 to 500 p.s.i.g. a mixture consisting essentially of (1) from 80 to 1 wt. percent of an unsaturated alpha beta dicarboxylic acid cyclic anhydride, said unsaturation being olefinic unsaturation, and (2) from 20 to 99 wt. percent of a solid low pressure alpha olefin polyalkene polymer selected from the group consisting of polyethylene, polypropylene, polybutene, polyheptene, ethylene-propylene copolymer and ethylene-butene copolymer, and formed by the polymerization of the corresponding alpha olefins at a temperature in the range of 0 to 100° C. and at a pressure in the range of 0 to 500 p.s.i.g. using as catalyst a reaction product obtained by reducing a reducible heavy transition metal compound of groups IV–B, VI–B and VIII with a reducing organo-metallic compound, the metal component of which is selected from the group consisting of alkali metals, alkaline earth metals, rare earth metals, and zinc.

4. The process of claim 1 wherein the heating is carried out in an inert solvent.

5. The process of claim 1 wherein the mixture includes 0.1 to 1 wt. percent of a peroxide catalyst.

6. A process for preparing a solid modified polymer consisting of the steps of forming a mixture consisting essentially of (1) 50 to 99 wt. percent of solid polyethylene formed by the polymerization of ethylene at a temperature in the range of 0 to 100° C. and at a pressure in the range of 0 to 500 p.s.i.g. using as catalyst the reaction product obtained by reducing a reducible heavy transition metal compound of groups IV–B, VI–B, and VIII with a reducing organo-metallic compound, the metal component of which is selected from the group consisting of alkali metals, alkaline earth metals, rare earth metals and zinc, and (2) 1 to 50 wt. percent maleic anhydride; heating the mixture to a temperature in the range of 250 to 400° F. and a pressure of from 0 to 500 p.s.i.g. to form a reaction mixture containing said solid modified polymer; and isolating said solid modified polymer therefrom.

7. A process for preparing a solid modified polymer consisting of the steps of forming a mixture consisting essentially of (1) 50 to 99 wt. percent of solid polypropylene formed by the polymerization of propylene at a temperature in the range of 0 to 100° C. and at a pressure in the range of 0 to 500 p.s.i.g. using as catalyst the reaction product obtained by reducing a reducible heavy transition metal compound of groups IV–B, VI–B and VIII with a reducing organo-metallic compound, the metal component of which is selected from the group consisting of alkali metals, alkaline earth metals, rare earth metals and zinc, and (2) 1 to 50 wt. percent maleic anhydride; heating the mixture to a temperature in the range of 250 to 400° F. and a pressure of from 0 to 500 p.s.i.g. to form a reaction mixture containing said solid modified polymer; and isolating said solid modified polymer therefrom.

8. The process of claim 1 wherein the reaction is carried out in an inert liquid hydrocarbon diluent medium.

9. The process of claim 6 wherein the reaction is carried out in an inert liquid hydrocarbon diluent medium.

References Cited in the file of this patent

UNITED STATES PATENTS

| 2,055,456 | Eichwald | Sept. 22, 1936 |
| 2,142,980 | Huijser et al. | Jan. 3, 1949 |
| 2,634,256 | Sparks et al. | Apr. 7, 1954 |
| 2,766,214 | Erchak et al. | Oct. 9, 1956 |
| 2,825,723 | Ballauf et al. | Mar. 4, 1958 |
| 2,883,367 | Dazzi | Apr. 21, 1959 |

FOREIGN PATENTS

| 766,745 | Great Britain | Jan. 23, 1957 |

OTHER REFERENCES

Pauling: General Chemistry, Freeman & Co. (1947), page 61.

Lange: Handbook of Chemistry, 7th ed., Handbook Publ. (1949), pages 58–59.

Gardner: Maleic Anhydride Derivatives, Wiley & Sons (1952), page 1.

Flett et al.: Maleic Anhydride Derivatives, Wiley & Sons (1952), pages 1–3.

Lucas: Organic Chemistry, American Book Co. (1935), pages 192–193.

Gourlay et al.: British Plastics (December 1956), pages 446–451.